US006316174B1

(12) United States Patent
Sawyer et al.

(10) Patent No.: US 6,316,174 B1
(45) Date of Patent: Nov. 13, 2001

(54) COLOR NEGATIVE FILM

(75) Inventors: John F. Sawyer, Fairport; Sharon R. Lunt, Webster, both of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/645,681

(22) Filed: Aug. 24, 2000

(51) Int. Cl.[7] .............................. G03C 1/00; G03B 17/02
(52) U.S. Cl. .............................................. 430/496; 396/6
(58) Field of Search .................................. 430/496; 396/6

(56) References Cited

U.S. PATENT DOCUMENTS 5,223,871 6/1993 Iwagaki et al. .

OTHER PUBLICATIONS

Analysis of Superia Reala 100 Film by Fuji Photo Film Co.

*Primary Examiner*—Hoa Van Le
(74) *Attorney, Agent, or Firm*—Arthur E. Kluegel

(57) ABSTRACT

A multicolor negative image capture film element comprises multiple silver halide emulsion layers that together exhibit a more gradually sloped density to exposure relationship than is customary while providing a combination of improved latitude and desirable overexposure printing density reduction.

40 Claims, No Drawings

COLOR NEGATIVE FILM

FIELD OF THE INVENTION

This invention relates to a color negative film having an aged ISO speed of at least 448 and containing labeling and/or exhibiting characteristic features that enable improved underexposure latitude and overexposure printing density and a method of imaging therewith.

BACKGROUND OF THE INVENTION

Definitions

The following definitions apply to the subsequent discussion:

"Aged ISO Speed" means an ISO speed value determined after storage of the film at 22° C., 50% RH and a radiation of 35 mR for a period of 6 months after manufacture with 1 week latent imaging keeping.

"Average Slope" means the value obtained by measuring the slope of the line connecting the densities at 1.41 and at 0.81 log H above the ISO speed point on a Status M density plot.

"Composite" means, with respect to slope or density of a characteristic curve, that Status M measurement protocol is used to obtain a characteristic curve for each of the three color records, and the slope or density value is then composited by summing 40% of the red value, 40% of the green value, and 20% of the blue value to yield a composite slope (CS) or density (CD).

"Designated" means information provided in human or non-human readable forms and includes a DX code. The information may be provided anywhere in or on the package including without limitation on the wrapping, container, cassette, film, or co-packaged camera.

"Exposure Index" (EI) means an exposure scale other than ISO speed used to designate the speed of a film.

"Extended Overexposure Latitude" (EOL) means that the slope of each of the three records at 2.45 log H above the ISO speed point is at least 75% of the Average Slope (AS) for that record.

"Slope Ratio (G/B)" means the ratio of the Average Slope of the green record divided by the Average Slope of the blue record.

"ISO speed" means the speed determined in accordance with ANSI PH2.27-1988, corresponding to the log H exposure value at a density of 0.15 above Dmin on a Status M density plot.

"log $H_{aged}$" means the log H exposure value corresponding to the Aged ISO speed.

"log $H_{designated}$" means the log H exposure value corresponding to the designated speed of the film.

"Overexposure Printing Density" means the density resulting from an 18% gray card that is over-exposed by 4 stops (1.2 log H). A normally exposed gray card is considered to be exposed at 0.81 log H above the ISO speed point (0.15 density above Dmin) for a film whose Aged ISO Speed exactly equals the designated speed. Thus, a four stop overexposed gray card would be exposed at 2.01 log H above the ISO speed point. For films whose actual speed does not equal the designated speed, the log H exposure for a gray card is defined as:

$$\log H_{gray}=\log\ (9.07/H_{designated}).$$

The 4 over exposure point is 1.2 log H more exposed than this value.

Background

The quality of many photograph images can be improved by using a film that has a high speed, or high sensitivity to light. Such films are able to capture image details under much lower light conditions than the corresponding lower speed films. For instance, an ISO 400 speed film is preferred over an ISO 200 speed film. A 400 speed film nominally requires half the exposure required of a 200 speed film in order to obtain the same details. Often times the image is in motion and thus one cannot control the exposure by simply increasing the exposure time. Thus, one reason to choose a high-speed film is to have increased underexposure latitude.

One approach to providing more speed for the consumer is to design a film whose speed is greater than the speed encoded in the cartridge DX code and/or the speed stated on the film packaging. For instance, one might design a film whose speed measures ISO 500 but encode and market it as an EI 400 speed film. This will provide an extra 0.10 log E of underexposure latitude. However, there is a disadvantage to having a film whose speed is faster than the DX code and/or the stated speed. The increase in film speed will cause all exposures to be increased. This, in turn, will result in an increase in the density of the negative. Increased density results in an increase in printing time, a very undesirable disadvantage. In addition, due to effects of paper reciprocity, and transmission of unwanted wavelengths through the exposing filters, increased printing time can lead to errors in printing color and density. Furthermore, whether an image is initially scanned for processing through an optical or digital printing system, there is an increase in scanning noise with more dense negatives, another very undesirable disadvantage.

For an example of the effects on printing time, an increase in speed of 0.10 log H for a film with a conventional film gamma of 0.63 will result in an increase of 0.063 printing density. Such an increase in printing density is equivalent to an increase of 16% in printing time. This is an unacceptable increase in printing time for photofinishing laboratories. Moreover, the increase in printing time is particularly disadvantageous for negatives that are over-exposed For example, for an ISO 400 speed film, some cameras will produce an exposure that is 1.2 log H (4 stops) overexposed in sunny lighting conditions. These negatives would normally require a lengthy printing time because of their high density. A further 16% increase in the already lengthy printing time is even more undesirable. Recognizing that overexposure is increasingly likely as one moves up the speed scale, the increased overexposure printing problem becomes more and more of a problem as speed is increased. An increase in printing density at the above described exposure point is thus considered to be an undesired consequence of using a film that is more sensitive to light than is indicated by the stated speed.

It is desirable to find a means to reduce the printing density disadvantage that results from providing increased film speed. One solution is to reduce the minimum densities of the negative. However, the minimum density is limited by support density, emulsion fog, retained spectral sensitizer dyes, masking couplers, and filter dyes. In a well-designed film the minimum densities have already been reduced as much as practical.

U.S. Pat. No. 5,223,871 discloses a preloaded camera having a lens with a focal length not more than 23 mm and a film element with a close to linear characteristic curve over a specified exposure range to improve manual printability in a photofinishing laboratory. However, the green and blue color records do not exhibit a desired level of parallelism necessary to maintain the same printing density neutral balance over a wide exposure range.

It is a problem to be solved to provide a high speed photographic film that enables improved underexposure latitude and desirable overexposure printing density.

SUMMARY OF THE INVENTION

A multicolor negative image capture film element comprises multiple silver halide emulsion layers that together exhibit a more gradually sloped density to exposure relationship than is customary. The invention also provides a method of forming an image in the element of the invention and a method of printing an image from such an element using optical or digital printing.

The invention provides a combination of improved under exposure latitude and desirable overexposure printing density reduction.

DETAILED DESCRIPTION OF THE INVENTION

The present invention depends on the proper selection of materials available for combination into a silver halide image capture multicolor photographic element. The materials are suitable for meeting the desired density relationships vs exposure. Heretofore it had not been known to employ higher speed films having speed in excess of the designated value, especially those with broad latitude and, in particular, overexposure latitude. Such films have now been found to be advantageous.

There are various means available to obtain the imaging parameters of the invention. One can obtain a desired contrast or other characteristic curve feature, for example, by selecting the species (more or less active) and total and relative amounts of components such as inhibitors, silver and couplers. Other compounds can also have an effect such as scavengers and compounds that influence the behavior of specific emulsions.

In one form, an embodiment of the invention provides a packaged color negative film (a) containing a designated ISO speed or Exposure Index (EI) of 400 or higher; (b) exhibiting an Aged ISO speed of at least 12% greater than that designated; and (c) exhibiting Extended Overexposure Latitude (EOL). In a further embodiment, it provides a packaged color negative film (a) containing a designated ISO speed of 400 or higher; and (b) exhibiting an Aged ISO speed of at least 12% greater than that designated; and in a third embodiment additionally exhibits (c) Extended Overexposure Latitude (EOL).

In another form of the invention, an embodiment provides a packaged color negative film (a) containing a designated ISO speed or Exposure Index (EI); (b) exhibiting an Aged ISO speed at least 12% greater than that designated; (c) exhibiting Extended Overexposure Latitude (EOL); and (d) exhibiting a Composite Average Slope (CS) such that 0.50<CS<0.60. In another embodiment, the invention provides a packaged color negative film (a) containing a designated ISO speed or Exposure Index (EI); (b) exhibiting an Aged ISO speed at least 12% greater than that designated; (c) exhibiting Extended Overexposure Latitude (EOL); and (d) exhibiting a Green Average Slope (GS) such that 0.50<GS<0.60.

packaged color negative film (a) containing a designated ISO speed or Exposure Index (EI); (b) exhibiting an Aged ISO speed at least 12% greater than that designated; (c) exhibiting Extended Overexposure Latitude (EOL); and (d) exhibiting a Status M Composite density ($D_c$), at a log H corresponding to 1.2 log H more exposed than that for an 18% gray card, of not more than the value given by equation (I).

$$D_c=1.347+0.605(\log H_{Aged}-\log H_{Designated}) \qquad \text{I}$$

In a narrower form of the invention and a still narrower form of the invention, the formula may be represented by:

$$D_c=1.326+0.596(\log H_{Aged}-\log H_{Designated})$$

or $$D_c=1.306+0.586(\log H_{Aged}-\log H_{Designated}).$$

Expressed in terms of the green record, an embodiment provides a packaged color negative film (a) containing a designated ISO speed or Exposure Index (EI); (b) exhibiting an Aged ISO speed or EI at least 12% greater than that designated; (c) exhibiting Extended Overexposure Latitude (EOL); and (d) exhibiting a Status M green density ($D_g$), at a log H corresponding to 1.2 log H more exposed than that for an 18% gray card, of not more than the value given by equation (II).

$$D_g=1.340+0.591(\log H_{Aged}-\log H_{designated}) \qquad \text{II}$$

In a narrower form of the invention and a still narrower form of the invention, the formula may be represented by:

$$D_g=1.319+0.582(\log H_{Aged}-\log H_{Designated})$$

$$D_g=1.300+0.573(\log H_{Aged}-\log H_{Designated}).$$

In a further form, the invention provides color negative silver halide multilayer film embodiment exhibiting (a) an Aged ISO speed of at least 448; (b) a Composite Average Slope (CS) such that 0.50<CS<0.60; (c) a Slope Ratio (G/B) of at least 0.88; and (d) Extended Overexposure Latitude (EOL); and, in terms of the green record, a color negative silver halide multilayer film embodiment exhibiting (a) an Aged ISO speed of at least 448; (b) a Green Average Slope (GS) such that 0.50<GS<0.60; (c) a Slope Ratio (G/B) of at least 0.88; and (d) Extended Overexposure Latitude (EOL).

Finally, a still further form of the invention provides a color negative film embodiment exhibiting (a) an Aged ISO speed of at least 448; (b) Extended Overexposure Latitude (EOL); (c) a Slope Ratio (G/B) of at least 0.88; and (d) a Composite density ($D_c$), at 2.01 log H above the log H value at which the composite density is 0.15 above Dmin, of not more than 1.35, or, in terms of the green record, a color negative film exhibiting (a) an Aged ISO speed of at least 448; (b) Extended Overexposure Latitude (EOL); (c) a Slope Ratio (G/B) of at least 0.88; and (d) a Status M green density ($D_g$), at 2.01 log H above the log H value at which the green density is 0.15 above Dmin, of not more than 1.34.

In narrower and still narrower equations, ($D_c$), at 2.01 log H above the log H value at which the composite density is 0.15 above Dmin, is not more than 1.33 or 1.31, respectively. In terms of the green density, the value is not more than 1.32 or 1.30, respectively.

The invention also provides a method of forming an image in any of the foregoing elements comprising contacting the element with a color developer and a method of printing an image from such an element using optical or scan digital printing.

In addition to improved underexposure latitude and improved density at four stops overexposure, embodiments of the invention provide a good neutral balance and corresponding color accuracy as a function of exposure. They also provide a decrease in scanning noise and in printing color and density errors for overexposed negatives in optical or digital printing systems and for an improvement in overall exposure latitude.

The image is formed in the element by exposure to actinic radiation, as described hereinafter. Printing is accomplished by either using light to form a print optically or by using a scanner to read the film and then print a corresponding positive image using a marking engine containing a laser, LED, CRT, or other suitable radiation source.

The photographic elements of the invention are so-called color negative elements capable of producing multicolor images. Such elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art.

A typical multicolor photographic negative element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, and subbing layers.

If desired, the photographic element can be used in conjunction with an applied magnetic layer as described in *Research Disclosure,* November 1992, Item 34390 published by Kenneth Mason Publications, Ltd., Dudley Annex, 12a North Street, Emsworth, Hampshire P010 7DQ, ENGLAND, and as described in Hatsumi Kyoukai Koukai Gihou No. 94-6023, published Mar. 15, 1994, available from the Japanese Patent Office. When it is desired to employ the inventive materials in a small format film, *Research Disclosure,* June 1994, Item 36230, provides suitable embodiments. The photographic element of the invention can be incorporated into exposure structures intended for repeated use or exposure structures intended for limited re-use, variously referred to by names such as "one time or single use cameras", "lens with film", or "photosensitive material package units".

The materials useful in the invention can be used in any of the ways and in any of the combinations known in the art. Typically, the materials are incorporated in a melt and coated as a layers described herein on a support to form part of a photographic element.

To control the migration of various components, it may be desirable to include a high molecular weight hydrophobe or "ballast" group in some of the materials. Representative ballast groups include substituted or unsubstituted alkyl or aryl groups containing 8 to 48 carbon atoms.

In the following discussion of suitable materials for use in the emulsions and elements of this invention, reference will be made to *Research Disclosure,* September 1996, Item 38957, available as described above, which is referred to herein by the term "Research Disclosure". The Sections hereinafter referred to are Sections of the Research Disclosure.

Except as provided, the silver halide emulsion containing elements employed in this invention are negative-working and are processed in the conventional color negative manner as typically indicated by the processing instructions provided with the element. Suitable emulsions and their preparation as well as methods of chemical and spectral sensitization are described in Sections I through V. Various additives such as UV dyes, brighteners, antifoggants, stabilizers, light absorbing and scattering materials, and physical property modifying addenda such as hardeners, coating aids, plasticizers, lubricants and matting agents are described, for example, in Sections II and VI through VIII. Color materials are described in Sections X through XIII. Suitable methods for incorporating couplers and dyes, including dispersions in organic solvents, are described in Section X(E). Scan facilitating is described in Section XIV. Supports, exposure, development systems, and processing methods and agents are described in Sections XV to XX. The information contained in the September 1994 *Research Disclosure,* Item No. 36544 referenced above, is updated in the September 1996 *Research Disclosure,* Item No. 38957.

Image dye-forming couplers are included in the element such as couplers that form cyan dyes upon reaction with oxidized color developing agents which are described in such representative patents and publications as: "Farbkuppler-eine Literature Ubersicht," published in Agfa Mitteilungen, Band III, pp. 156–175 (1961) as well as in U.S. Pat. Nos. 2,367,531; 2,423,730; 2,474,293; 2,772,162; 2,895,826; 3,002,836; 3,034,892; 3,041,236; 4,333,999; 4,746,602; 4,753,871; 4,770,988; 4,775,616; 4,818,667; 4,818,672; 4,822,729; 4,839,267; 4,840,883; 4,849,328; 4,865,961; 4,873,183; 4,883,746; 4,900,656; 4,904,575; 4,916,051; 4,921,783; 4,923,791; 4,950,585; 4,971,898; 4,990,436; 4,996,139; 5,008,180; 5,015,565; 5,011,765; 5,011,766; 5,017,467; 5,045,442; 5,051,347; 5,061,613; 5,071,737; 5,075,207; 5,091,297; 5,094,938; 5,104,783; 5,178,993; 5,813,729; 5,187,057; 5,192,651; 5,200,305 5,202,224; 5,206,130; 5,208,141; 5,210,011; 5,215,871; 5,223,386; 5,227,287; 5,256,526; 5,258,270; 5,272,051; 5,306,610; 5,326,682; 5,366,856; 5,378,596; 5,380,638; 5,382,502; 5,384,236; 5,397,691; 5,415,990; 5,434,034; 5,441,863; EPO 0 246 616; EPO 0 250 201; EPO 0 271 323; EPO 0 295 632; EPO 0 307 927; EPO 0 333 185; EPO 0 378 898; EPO 0 389 817; EPO 0 487 111; EPO 0 488 248; EPO 0 539 034; EPO 0 545 300; EPO 0 556 700; EPO 0 556 777; EPO 0 556 858; EPO 0 569 979; EPO 0 608 133; EPO 0 636 936; EPO 0 651 286; EPO 0 690 344; German OLS 4,026,903; German OLS 3,624,777. and German OLS 3,823,049. Typically such couplers are phenols, naphthols, or pyroloazoles.

Couplers that form magenta dyes upon reaction with oxidized color developing agent are described in such representative patents and publications as: "Farbkuppler-eine Literature Ubersicht," published in Agfa Mitteilungen, Band III, pp. 126–156 (1961) as well as U.S. Pat. Nos. 2,311,082 and 2,369,489; 2,343,701; 2,600,788; 2,908,573; 3,062,653; 3,152,896; 3,519,429; 3,758,309; 3,935,015; 4,540,654; 4,745,052; 4,762,775; 4,791,052; 4,812,576; 4,835,094; 4,840,877; 4,845,022; 4,853,319; 4,868,099; 4,865,960; 4,871,652; 4,876,182; 4,892,805; 4,900,657; 4,910,124; 4,914,013; 4,921,968; 4,929,540; 4,933,465; 4,942,116; 4,942,117; 4,942,118; 4,959,480; 4,968,594; 4,988,614; 4,992,361; 5,002,864; 5,021,325; 5,066,575; 5,068,171; 5,071,739; 5,100,772; 5,110,942; 5,116,990; 5,118,812; 5,134,059; 5,155,016; 5,183,728; 5,234,805; 5,235,058; 5,250,400; 5,254,446; 5,262,292; 5,300,407; 5,302,496; 5,336,593; 5,350,667; 5,395,968; 5,354,826; 5,358,829; 5,368,998; 5,378,587; 5,409,808; 5,411,841; 5,418,123; 5,424,179; EPO 0 257 854; EPO 0 284 240; EPO 0 341 204; EPO 347,235; EPO 365,252; EPO 0 422 595; EPO 0 428 899; EPO 0 428 902; EPO 0 459331; EPO 0467 327; EPO 0 476 949; EPO 0 487 081; EPO 0 489 333; EPO 0 512304; EPO 0515 128; EPO 0 534 703; EPO 0 554 778; EPO 0 558 145; EPO 0 571 959; EPO 0 583 832; EPO 0 583 834; EPO 0 584 793; EPO 0 602 748; EPO 0 602 749; EPO 0 605 918; EPO 0 622 672; EPO 0 622 673; EPO 0 629 912; EPO 0 646 841, EPO 0 656 561; EPO 0 660 177; EPO 0 686 872; WO 90/10253; WO 92/09010; WO 92/10788; WO 92/12464; WO 93/01523; WO 93/02392; WO 93/02393; WO 93/07534; UK Application 2,244,053; Japanese Application 03192-350; German OLS 3,624,103; German OLS 3,912, 265; and German OLS 40 08 067. Typically such couplers are pyrazolones, pyrazoloazoles, or pyrazolobenzimidazoles that form magenta dyes upon reaction with oxidized color developing agents.

Couplers that form yellow dyes upon reaction with oxidized color developing agent are described in such representative patents and publications as: "Farbkuppler-eine Literature Ubersicht," published in Agfa Mitteilungen; Band III; pp0.112–126 (1961); as well as U.S. Pat. Nos. 2,298, 443; 2,407,210; 2,875,057; 3,048,194; 3,265,506; 3,447, 928; 4,022,620; 4,443,536; 4,758,501; 4,791,050; 4,824, 771; 4,824,773; 4,855,222; 4,978,605; 4,992,360; 4,994, 361; 5,021,333; 5,053,325; 5,066,574; 5,066,576; 5,100, 773; 5,118,599; 5,143,823; 5,187,055; 5,190,848; 5,213, 958; 5,215,877; 5,215,878; 5,217,857; 5,219,716; 5,238, 803; 5,283,166; 5,294,531; 5,306,609; 5,328,818; 5,336, 591; 5,338,654; 5,358,835; 5,358,838; 5,360,713; 5,362, 617; 5,382,506; 5,389,504; 5,399,474;. 5,405,737; 5,411, 848; 5,427,898; EPO 0 327 976; EPO 0 296 793; EPO 0 365 282; EPO 0 379 309; EPO 0415 375; EPO 0 437 818; EPO 0 447 969; EPO 0 542 463; EPO 0 568 037; EPO 0 568 196; EPO 0 568 777; EPO 0 570 006; EPO 0 573 761; EPO 0 608 956; EPO 0 608 957; and EPO 0 628 865. Such couplers are typically open chain ketomethylene compounds.

Couplers that form colorless products upon reaction with oxidized color developing agent are described in such representative patents as: UK. 861,138; U.S. Pat. Nos. 3,632, 345; 3,928,041; 3,958,993 and 3,961,959. Typically such couplers are cyclic carbonyl containing compounds that form colorless products on reaction with an oxidized color developing agent.

Couplers that form black dyes upon reaction with oxidized color developing agent are described in such representative patents as U.S. Pat. Nos. 1,939,231; 2,181,944; 2,333,106; and 4,126,461; German OLS No. 2,644,194 and German OLS No. 2,650,764. Typically, such couplers are resorcinols or m-aminophenols that form black or neutral products on reaction with oxidized color developing agent.

In addition to the foregoing, so-called "universal" or "washout" couplers may be employed. These couplers do not contribute to image dye-formation. Thus, for example, a naphthol having an unsubstituted carbamoyl or one substituted with a low molecular weight substituent at the 2- or 3-position may be employed. Couplers of this type are described, for example, in U.S. Pat. Nos. 5,026,628, 5,151, 343, and 5,234,800.

It may be useful to use a combination of couplers any of which may contain known ballasts or coupling-off groups such as those described in U.S. Pat. Nos. 4,301,235; 4,853, 319 and 4,351,897. The coupler may contain solubilizing groups such as described in U.S. Pat. No. 4,482,629. The coupler may also be used in association with "wrong" colored couplers (e.g. to adjust levels of interlayer correction) and, in color negative applications, with masking couplers such as those described in EP 213.490; Japanese Published Application 58-172,647; U.S. Pat. Nos. 2,983, 608; 4,070,191; and 4,273,861; German Applications DE 2,706,117 and DE 2,643,965; UK. Patent 1,530,272; and Japanese Application 58-113935. The masking couplers may be shifted or blocked, if desired.

The invention may be used in association with materials that release Photographically Useful Groups (PUGS) that accelerate or otherwise modify the processing steps e.g. of bleaching or fixing to improve the quality of the image. Bleach accelerator releasing couplers such as those described in EP 193,389; EP 301,477; U.S. Pat. Nos. 4,163, 669; 4,865,956; and 4,923,784, may be useful. Also contemplated is use in association with nucleating agents, development accelerators or their precursors (UK Patent 2,097,140; UK. Patent 2,131,188); electron transfer agents (U.S. Pat. Nos. 4,859,578; 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The invention may also be used in combination with filter dye layers comprising colloidal silver sol or yellow, cyan, and/or magenta filter dyes, either as oil-in-water dispersions, latex dispersions or as solid particle dispersions. Additionally, they may be used with "smearing" couplers (e.g. as described in U.S. Pat. No. 4,366,237; EP 96,570; U.S. Pat. Nos. 4,420,556; and 4,543,323.) Also, the materials useful in the invention may be blocked or coated in protected form as described, for example, in Japanese Application 61/258,249 or U.S. Pat. No. 5,019,492.

The invention may further be used in combination with image-modifying compounds that release PUGS such as "Developer Inhibitor-Releasing" compounds (DIR's). DIR's useful in conjunction with the invention are known in the art and examples are described in U.S. Pat. Nos. 3,137, 578; 3,148,022; 3,148,062; 3,227,554; 3,384,657; 3,379, 529; 3,615,506; 3,617,291; 3,620,746; 3,701,783; 3,733, 201; 4,049,455; 4,095,984; 4,126,459; 4,149,886; 4,150, 228; 4,211,562; 4,248,962; 4,259,437; 4,362,878; 4,409, 323; 4,477,563; 4,782,012; 4,962,018; 4,500,634; 4,579, 816; 4,607,004; 4,618,571; 4,678,739; 4,746,600; 4,746, 601; 4,791,049; 4,857,447; 4,865,959; 4,880,342; 4,886, 736; 4,937,179; 4,946,767; 4,948,716; 4,952,485; 4,956, 269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346,899; 362, 870; 365,252; 365,346; 373,382; 376,212; 377,463; 378, 236; 384,670; 396,486; 401,612; 401,613.

Such compounds are also disclosed in "Developer-Inhibitor-Releasing (DIR) Couplers for Color Photography," C. R. Barr, J. R. Thirtle and P. W. Vittum in *Photographic Science and Engineering,* Vol. 13, p. 174 (1969). Generally, the developer inhibitor-releasing (DIR) couplers include a coupler moiety and an inhibitor coupling-off moiety (IN). The inhibitor-releasing couplers may be of the time-delayed type (DIAR couplers) which also include a timing moiety or chemical switch which produces a delayed release of inhibitor. Examples of typical inhibitor moieties are: oxazoles, thiazoles, diazoles, triazoles, oxadiazoles, thiadiazoles, oxathiazoles, thiatriazoles, benzotriazoles, tetrazoles, benzimidazoles, indazoles, isoindazoles, mercaptotetrazoles, selenotetrazoles, mercaptobenzothiazoles, selenobenzothiazoles, mercaptobenzoxazoles, selenobenzoxazoles, mercaptobenzimidazoles, selenobenzimidazoles, benzodiazoles, mercaptooxazoles, mercaptothiadiazoles, mercaptothiazoles, mercaptotriazoles, mercaptooxadiazoles, mercaptodiazoles, mercaptooxathiazoles, telleurotetrazoles or benzisodiazoles. In a preferred embodiment, the inhibitor moiety or group is selected from the following formulas:

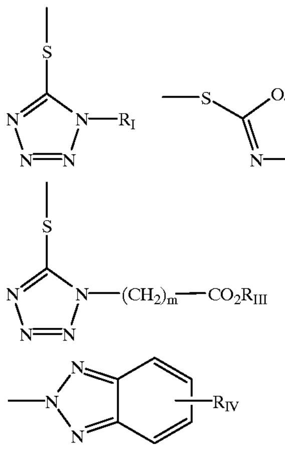

wherein $R_I$ is selected from the group consisting of straight and branched alkyls of from 1 to about 8 carbon atoms, benzyl, phenyl, and alkoxy groups and such groups containing none, one or more than one such substituent; $R_{II}$ is selected from $R_I$ and —$SR_I$; $R_{III}$ is a straight or branched alkyl group of from 1 to about 5 carbon atoms and m is from 1 to 3; and $R_{IV}$ is selected from the group consisting of hydrogen, halogens and alkoxy, phenyl and carbonamido groups, —COORV and —$NHCOOR_V$ wherein $R_V$ is selected from substituted and unsubstituted alkyl and aryl groups.

Although it is typical that the coupler moiety included in the developer inhibitor-releasing coupler forms an image dye corresponding to the layer in which it is located, it may also form a different color as one associated with a different film layer. It may also be useful that the coupler moiety included in the developer inhibitor-releasing coupler forms colorless products and/or products that wash out of the photographic material during processing (so-called "universal" couplers).

A compound such as a coupler may release a PUG directly upon reaction of the compound during processing, or indirectly through a timing or linking group. A timing group produces the time-delayed release of the PUG such groups using an intramolecular nucleophilic substitution reaction (U.S. Pat. No. 4,248,962); groups utilizing an electron transfer reaction along a conjugated system (U.S. Pat. Nos. 4,409,323; 4,421,845; 4,861,701, Japanese Applications 57-188035; 58-98728; 58-209736; 58-209738); groups that function as a coupler or reducing agent after the coupler reaction (U.S. Pat. Nos. 4,438,193; 4,618,571) and groups that combine the features describe above. It is typical that the timing group is of one of the formulas:

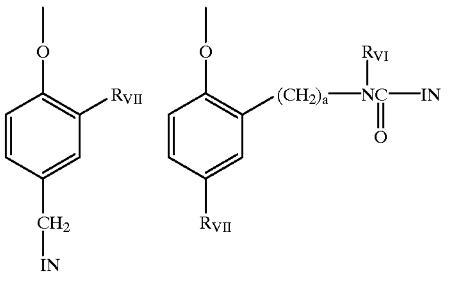

wherein IN is the inhibitor moiety, $R_{VII}$ is selected from the group consisting of nitro, cyano, alkylsulfonyl; sulfamoyl; and sulfonamido groups; a is 0 or 1; and $R_{VI}$ is selected from the group consisting of substituted and unsubstituted alkyl and phenyl groups. The oxygen atom of each timing group is bonded to the coupling-off position of the respective coupler moiety of the DIAR.

The timing or linking groups may also function by electron transfer down an unconjugated chain. Linking groups are known in the art under various names. Often they have been referred to as groups capable of utilizing a hemiacetal or iminoketal cleavage reaction or as groups capable of utilizing a cleavage reaction due to ester hydrolysis such as U.S. Pat. No. 4,546,073. This electron transfer down an unconjugated chain typically results in a relatively fast decomposition and the production of carbon dioxide, formaldehyde, or other low molecular weight by-products. The groups are exemplified in EP 464,612, EP 523,451, U.S. Pat. No. 4,146,396, Japanese Kokai 60-249148 and 60-249149.

Suitable developer inhibitor-releasing couplers for use in the present invention include, but are not limited to, the following:

D1

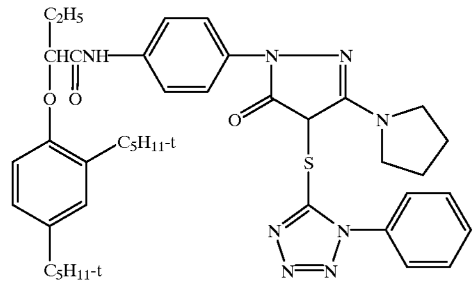

D2

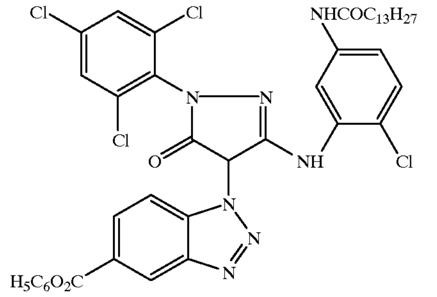

D3

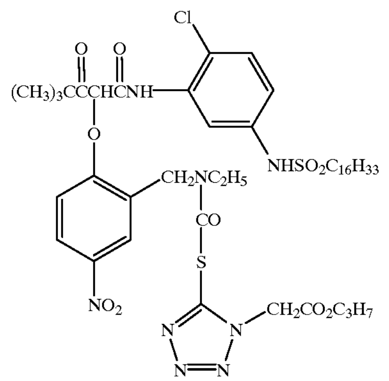

-continued
D4
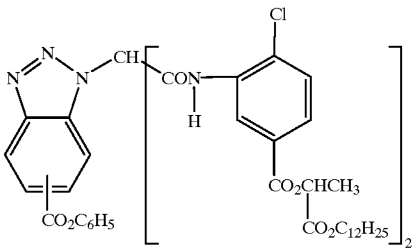
D5
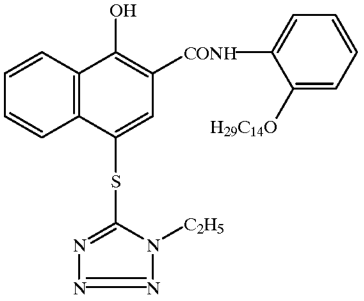
D6
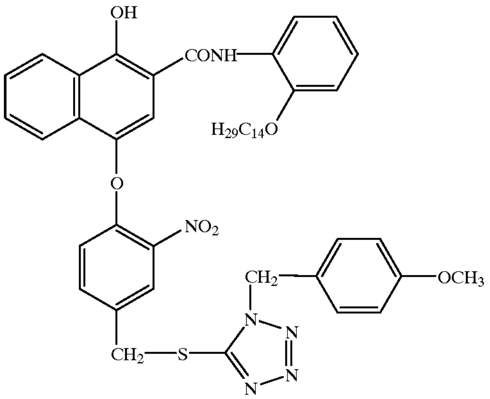
D7
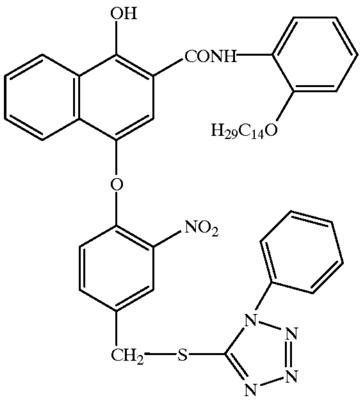
-continued
D8
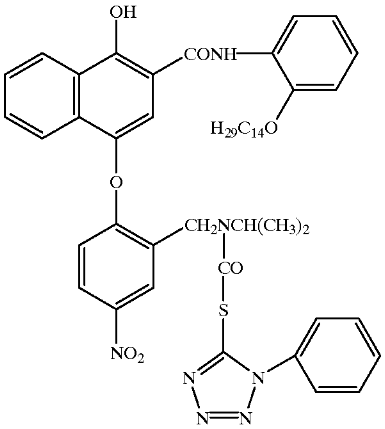
D9
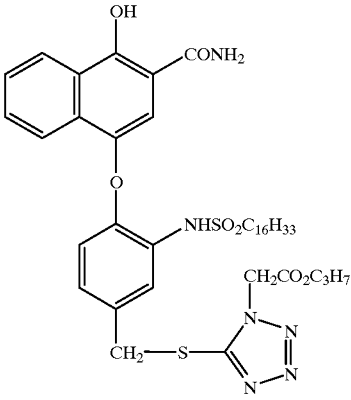
D10
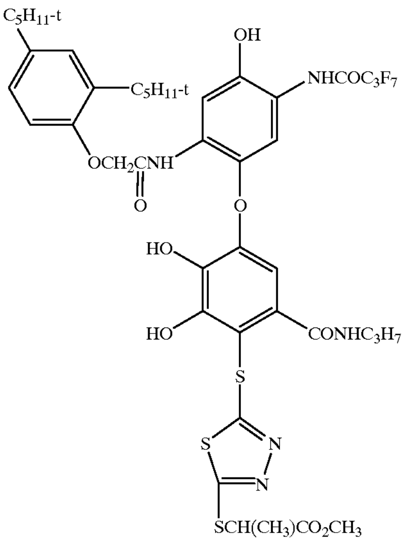

-continued

D11

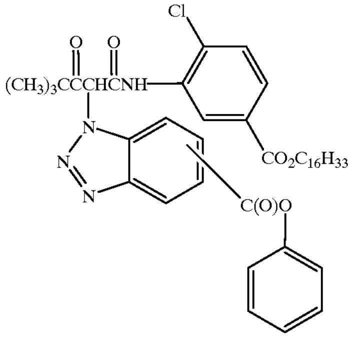

D12

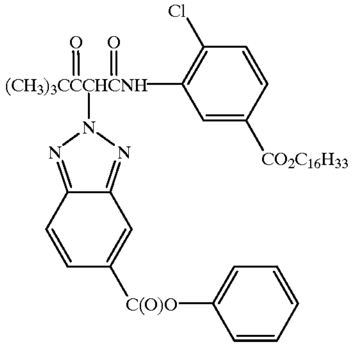

It is also contemplated that the present invention may be employed to obtain reflection color prints as described in *Research Disclosure,* November 1979, Item 18716, available from Kenneth Mason Publications, Ltd, Dudley Annex, 12a North Street, Emsworth, Hampshire P0101 7DQ, England. Materials useful in the invention may be coated on pH adjusted support as described in U.S. Pat. No. 4,917,994; on a support with reduced oxygen permeability (EP 553, 339); with epoxy solvents (EP 164,961); with nickel complex stabilizers (U.S. Pat. Nos. 4,346,165; 4,540,653 and 4,906,559 for example); with ballasted chelating agents such as those in U.S. Pat. No. 4,994,359 to reduce sensitivity to polyvalent cations such as calcium; and with stain reducing compounds such as described in U.S. Pat. No. 5,068,171. Other compounds useful in combination with the invention are disclosed in Japanese Published Applications described in Derwent Abstracts having accession numbers as follows: 90-072,629, 90-072,630; 90-072,631; 90-072,632; 90-072, 633; 90-072,634; 90-077,822; 90-078,229; 90-078,230; 90-079,336; 90-079,337; 90-079,338; 90-079,690; 90-079, 691; 90-080,487; 90-080,488; 90-080,489; 90-080,490; 90-080,491; 90-080,492; 90-080,494; 90-085,928; 90-086, 669; 90-086,670; 90-087,360; 90-087,361; 90-087,362; 90-087,363; 90-087,364; 90-088,097; 90-093,662; 90-093, 663; 90-093,664; 90-093,665; 90-093,666; 90-093,668; 90-094,055; 90-094,056; 90-103,409; 83-62,586; 83-09, 959.

Conventional radiation-sensitive silver halide emulsions can be employed in the practice of this invention. Such emulsions are illustrated by *Research Disclosure,* Item 38755, September 1996, I. Emulsion grains and their preparation.

Especially useful in this invention are tabular grain silver halide emulsions. Tabular grains are those having two parallel major crystal faces and having an aspect ratio of at least 2. The term “aspect ratio” is the ratio of the equivalent circular diameter (ECD) of a grain major face divided by its thickness (t). Tabular grain emulsions are those in which the tabular grains account for at least 50 percent (preferably at least 70 percent and optimally at least 90 percent) of the total grain projected area. Preferred tabular grain emulsions are those in which the average thickness of the tabular grains is less than 0.3 micrometer (preferably thin—that is, less than 0.2 micrometer and most preferably ultrathin—that is, less than 0.07 micrometer). The major faces of the tabular grains can lie in either {111} or {100} crystal planes. The mean ECD of tabular grain emulsions rarely exceeds 10 micrometers and more typically is less than 5 micrometers.

In their most widely used form tabular grain emulsions are high bromide {111} tabular grain emulsions. Such emulsions are illustrated by Kofron et al U.S. Pat. No. 4,439,520, Wilgus et al U.S. Pat. No. 4,434,226, Solberg et al U.S. Pat. No. 4,433,048, Maskasky U.S. Pat. Nos. 4,435, 501, 4,463,087 and 4,173,320, Daubendiek et al U.S. Pat. Nos. 4,414,310 and 4,914,014, Sowinski et al U.S. Pat. No. 4,656,122, Piggin et al U.S. Pat. Nos. 5,061,616 and 5,061, 609, Tsaur et al U.S. Pat. Nos. 5,147,771, ’772, ’773, 5,171,659 and 5,252,453, Black et al 5,219,720 and 5,334, 495, Delton U.S. Pat. Nos. 5,310,644, 5,372,927 and 5,460, 934, Wen U.S. Pat. No. 5,470,698, Fenton et al U.S. Pat. No. 5,476,760, Eshelman et al U.S. Pat. Nos. 5,612,175 and 5,614,359, and Irving et al U.S. Pat. No. 5,667,954.

Ultrathin high bromide {111} tabular grain emulsions are illustrated by Daubendiek et al U.S. Pat. Nos. 4,672,027, 4,693,964, 5,494,789, 5,503,971 and 5,576,168, Antoniades et al U.S. Pat. No. 5,250,403, Olm et al U.S. Pat. No. 5,503,970, Deaton et al U.S. Pat. No. 5,582,965, and Maskasky U.S. Pat. No. 5,667,955.

High bromide {100} tabular grain emulsions are illustrated by Mignot U.S. Pat. Nos. 4,386,156 and 5,386,156.

High chloride {111} tabular grain emulsions are illustrated by Wey U.S. Pat. No. 4,399,215, Wey et al U.S. Pat. No. 4,414,306, Maskasky U.S. Pat. Nos. 4,400,463, 4,713, 323, 5,061,617, 5,178,997, 5,183,732, 5,185,239, 5,399,478 and 5,411,852, and Maskasky et al U.S. Pat. Nos. 5,176,992 and 5,178,998. Ultrathin high chloride {111} tabular grain emulsions are illustrated by Maskasky U.S. Pat. Nos. 5,271, 858 and 5,389,509.

High chloride {100} tabular grain emulsions are illustrated by Maskasky U.S. Pat. Nos. 5,264,337, 5,292,632, 5,275,930 and 5,399,477, House et al U.S. Pat. No. 5,320, 938, Brust et al U.S. Pat. No. 5,314,798, Szajewski et al U.S. Pat. No. 5,356,764, Chang et al U.S. Pat. Nos. 5,413,904 and 5,663,041, Oyamada U.S. Pat. No. 5,593,821, Yamashita et al U.S. Pat. Nos. 5,641,620 and 5,652,088, Saitou et al U.S. Pat. No. 5,652,089, and Oyamada et al U.S. Pat. No. 5,665,530. Ultrathin high chloride {100} tabular grain emulsions can be prepared by nucleation in the presence of iodide, following the teaching of House et al and Chang et al, cited above.

The emulsions can be surface-sensitive emulsions, i.e., emulsions that form latent images primarily on the surfaces of the silver halide grains, or the emulsions can form internal latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent. Tabular grain emulsions of the latter type are illustrated by Evans et al. U.S. Pat. No. 4,504,570.

Photographic elements can be exposed to actinic radiation, typically in the visible region of the spectrum, to form a latent image and can then be processed to form a visible dye image. Processing to form a visible dye image includes the step of contacting the element with a color-developing agent to reduce developable silver halide and oxidize the color-developing agent. Oxidized color developing agent in turn reacts with the coupler to yield a dye. If desired "Redox Amplification" as described in Research Disclosure XVIIIB(5) may be used.

In the color negative image-capture type element of the invention, speed (the sensitivity of the element to low light conditions) is usually critical to obtaining sufficient image in such elements. Such elements are typically silver bromoiodide emulsions coated on a transparent support and are sold packaged with instructions to process in known color negative processes such as the Kodak C-41 process as described in The British Journal of Photography Annual of 1988, pages 191–198. Color negative development times are typically 3' 15" or less and desirably 90 or even 60 seconds or less.

A direct-view photographic element is one which yields a color image that is designed for human viewing (1) by reflected light, such as a photographic paper print, (2) by transmitted light, such as a display transparency, or (3) by projection, such as a color slide or a motion picture print. These direct-view elements may be exposed and processed in a variety of ways. For example, paper prints, display transparencies, and motion picture prints are typically produced by digitally printing or by optically printing an image from a color negative element of the invention onto the direct-viewing element and processing through an appropriate negative-working photographic process to give a positive color image. The element may be sold packaged with instructions for digital printing or for processing using a color negative optical printing process, as generally described in PCT WO 87/04534 or U.S. Pat. No. 4,975,357, to form a positive image. Color projection prints may be processed, for example, in accordance with the Kodak ECP-2 process as described in the H-24 Manual. Color print development times are typically 90 seconds or less and desirably 45 or even 30 seconds or less. Color slides may be produced in a similar manner but are more typically produced by exposing the film directly in a camera and processing through a reversal color process or a direct positive process to give a positive color image. The foregoing images may also be produced by alternative processes such as digital printing.

Each of these types of photographic elements has its own particular requirements for dye hue, but in general they all require cyan dyes whose absorption bands are less deeply absorbing (that is, shifted away from the red end of the spectrum) than color negative films. This is because dyes in direct-view elements are selected to have the best appearance when viewed by human eyes, whereas the dyes in image capture materials are designed to best match the needs of the printing process.

Preferred color developing agents for the color negative elements of the invention are p-phenylenediamines such as:

4-amino-N,N-diethylaniline hydrochloride,
4-amino-3-methyl-N,N-diethylaniline hydrochloride,
4-amino-3-methyl-N-ethyl-N-(2-methanesulfonamidoethyl) aniline sesquisulfate hydrate,
4-amino-3-methyl-N-ethyl-N-(2-hydroxyethyl)aniline sulfate,
4-amino-3-(2-methanesulfonamidoethyl)-N,N-diethylaniline hydrochloride, and
4-amino-N-ethyl-N-(2-methoxyethyl)-m-toluidine di-p-toluene sulfonic acid.

Development is usually followed by the conventional steps of bleaching, fixing, or bleach-fixing, to remove silver or silver halide, washing, and drying. However, scanning may also follow immediately after or during the development step.

The entire contents of the patents and other publications referred to in this specification and in the identified Research Disclosure publications are incorporated herein by reference.

Aside from the advantageous combination of improved under exposure latitude/and printing efficiency of the invention, embodiments of the invention include advantages related to noise introduced in scanning. These advantages may be further enhanced using reference exposure, as described in U.S. Pat. No. 5,667,944, or other information encoded in the film.

Photographic Examples

EXAMPLES 1–4

Several multilayer color photographic film elements were digitally constructed to have characteristic curves that have the parameters given in Table I. All films have a designated speed of 400.

Example 1 is a multilayer color photographic film element that is prepared having a Composite slope of 0.62 and having an aged ISO speed of 400 with an ISO 400 designation in packaging.

Example 2 is a multilayer color photographic film element that is prepared having the same Composite slope as in Example 1 with an ISO 400 designation in packaging but with an Aged ISO speed of 535 to increase under exposure latitude. As shown in Table I, the resulting difference in over exposure density due to the increase in film speed produces a highly undesirable loss of printer productivity of 20% with respect to the 400 speed film due to slower printing speed.

Example 3 is a multilayer color photographic film element that also has increased under exposure latitude due to its speed of ISO 535 and is prepared using emulsions so that the Composite Average slope of the three records is decreased by 4% compared to Example 2. This decrease in slope produces a 4 stop over exposure density that is well within the invention criterion that $$D_c \leq 1.347+0.605(\log H_{Aged} - \log H_{Designated})$$

since, for a designated ISO of 400 and an aged ISO of 535, Dc=1.42. This decrease in over exposure density results in a loss of printing time that is now only 5%, a much more desirable position. This design trade off allows for the desirable increase in underexposure latitude while still maintaining and acceptable printing throughput.

Example 4 is an alternative film wherein the Average Slope is reduced by 3% in each record and the toe contrast is reduced by 8%. In examples 3 and 4, the under exposure latitude is increased, but the gain in printing time is small, as per the invention.

TABLE I

| Example | Aged ISO speed | Composite Average Slope | Ratio G/B (Average Slopes) | Composite Overexposure Printing Density | % change in printing time at 4 stops overexposed |
|---|---|---|---|---|---|
| 1 (Comp) | 400 | 0.62 | 0.90 | 1.37 | ref |
| 2 (Comp) | 535 | 0.62 | 0.90 | 1.45 | 20% |
| 3 (Inv) | 535 | 0.589 | 0.90 | 1.39 | 5% |
| 4 (Inv) | 535 | 0.595 | 0.90 | 1.38 | 2% |

The table shows that an increase in film speed that provides a desired increase in under exposure latitude can be obtained while minimizing the undesirable disadvantage usually associated with increased film speed of increased printing time.

EXAMPLE 5

Another multilayer photographic film embodying the invention contains on a transparent acetate support the following:

| | mg/sq meter |
|---|---|
| Layer 1 | |
| Gray silver | 172 |
| Chem-2 | 16 |
| Dye-2 | 32 |
| Dye-3 | 2.7 |
| Dye-4 | 3.8 |
| Dye-5 | 75 |
| Chem-5 | 97 |
| Gelatin | 1990 |
| Layer 2 | |
| Slow cyan emulsion | 323 |
| Slow-slow cyan emulsion | 323 |
| Coup-1 | 446 |
| Coup-2 | 65 |
| Coup-3 | 15 |
| Coup-4 | 16 |
| Coup-6 | 16 |
| Coup-7 | 65 |
| Chem-1 | 10 |
| Gelatin | 1750 |
| Layer 3 | |
| Mid cyan emulsion | 635 |
| Coup-1 | 226 |
| Coup-3 | 56 |
| Coup-4 | 19 |
| Coup-5 | 12 |
| Coup-6 | 12 |
| Coup-7 | 47 |
| Chem-1 | 10 |
| Gelatin | 940 |
| Layer 4 | |
| Fast cyan emulsion | 603 |
| Fast-fast cyan emulsion | 312 |
| Coup-1 | 226 |
| Coup-3 | 43 |
| Coup-4 | 19 |
| Coup-5 | 19 |
| Coup-6 | 19 |
| Chem-1 | 15 |
| Gelatin | 1030 |
| Layer 5 | |
| Coup-4 | 16 |
| Chem-2 | 27 |

-continued

| | mg/sq meter |
|---|---|
| Gelatin | 540 |
| Layer 6 | |
| Slow magenta emulsion | 258 |
| Slow-slow magenta emul. | 65 |
| Coup-8 | 283 |
| Coup-9 | 93 |
| Chem-1 | 4.8 |
| Gelatin | 1180 |
| Layer 7 | |
| Mid magenta emulsion | 635 |
| Coup-8 | 179 |
| Coup-9 | 72 |
| Coup-5 | 16 |
| Coup-10 | 4.3 |
| Chem-1 | 10 |
| Gelatin | 1240 |
| Layer 8 | |
| Fast magenta emulsion | 603 |
| Fast-fast magenta emul. | 312 |
| Coup-8 | 70 |
| Coup-9 | 76 |
| Coup-10 | 16 |
| Coup-5 | 13 |
| Chem-1 | 6.2 |
| Gelatin | 970 |
| Layer 9 | |
| Coup-11 | 16 |
| Chem-2 | 27 |
| Dye-1 | 22 |
| Chem-1 | 2.9 |
| Gelatin | 540 |
| Layer 10 | |
| Mid yellow emulsion | 258 |
| Slow yellow emulsion | 322 |
| Slow-slow yellow emul. | 172 |
| Coup-7 | 968 |
| Coup-2 | 5.4 |
| Coup-12 | 81 |
| Coup-4 | 32 |
| Coup-1 | 75 |
| Chem-1 | 8.8 |
| Chem-3 | 5.4 |
| Chem-4 | .0011 |
| Chem-7 | 26 |
| Gelatin | 1570 |
| Layer 11 | |
| Fast yellow emulsion | 377 |
| Fast-fast yellow emul. | 377 |
| Lippman emulsion | 54 |
| Coup-7 | 344 |
| Coup-13 | 130 |
| Coup-12 | 113 |
| Coup-2 | 5.4 |
| Chem-1 | 10 |
| Chem-4 | .0011 |

-continued
| | mg/sq meter |
|---|---|
| Gelatin | 1180 |
| Layer 12 | |
| UV dyel | 160 |
| UV dye2 | 110 |
| Gelatin | 690 |
| Layer 13 | |
| Gelatin | 870 |
The above contains sequestrants, antifoggants, surfactants, antistat, matte beads and lubricants as is known in the art. The film also contains a hardener at 1.8% of total gel.
Coup-1
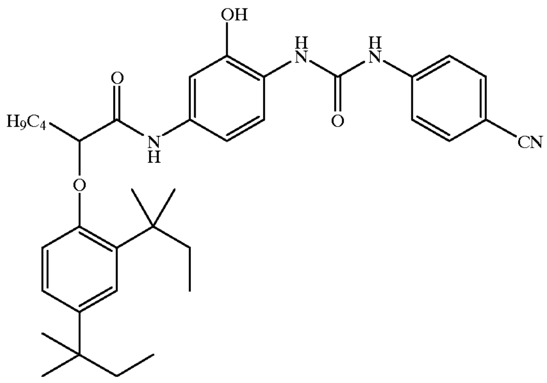
Coup-2
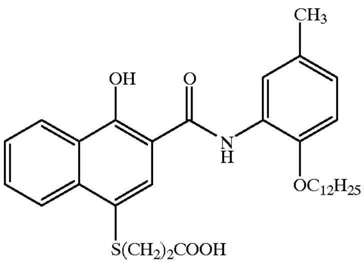
Coup-3
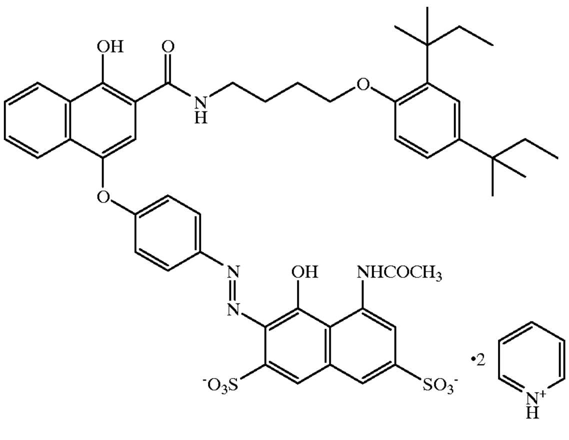
-continued
Coup-4
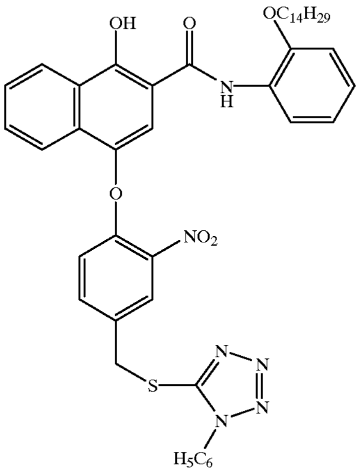
Coup-5
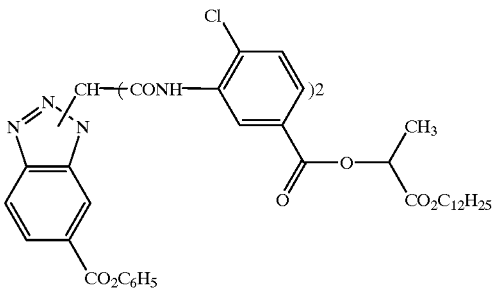
Coup-6
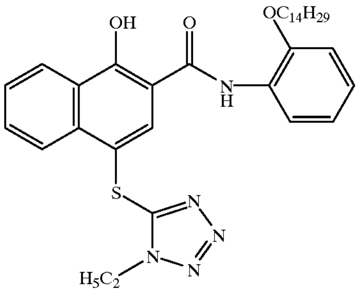
Coup-7
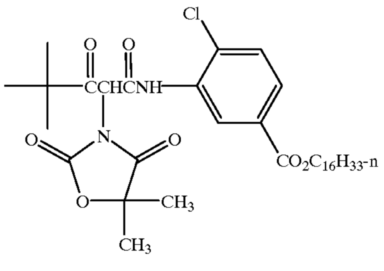

-continued
Coup-8
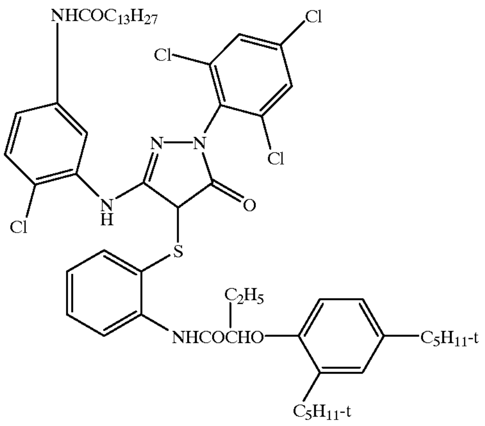
Coup-9
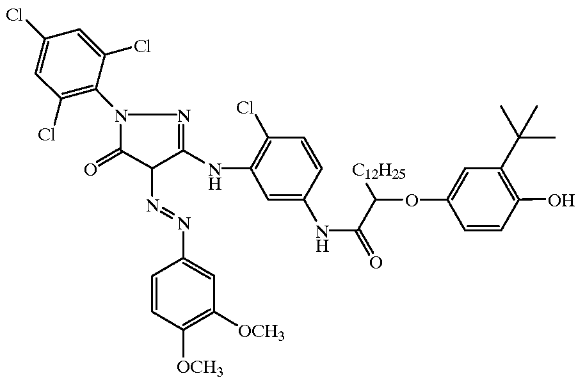
Coup-10
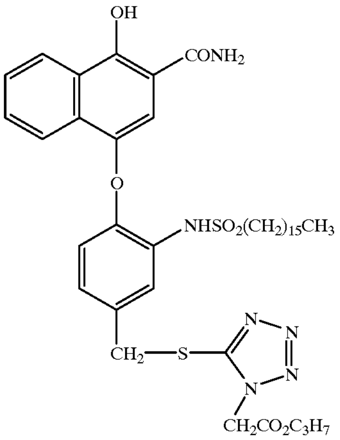
-continued
Coup-11
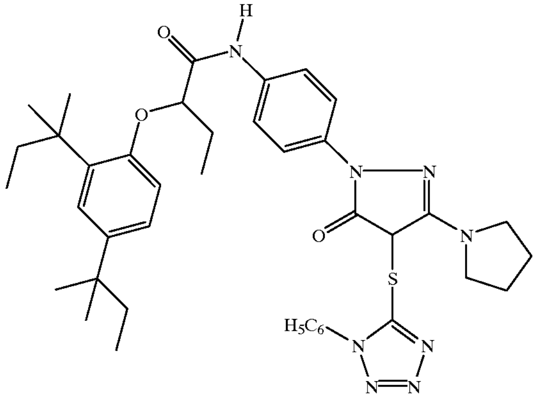
Coup-12
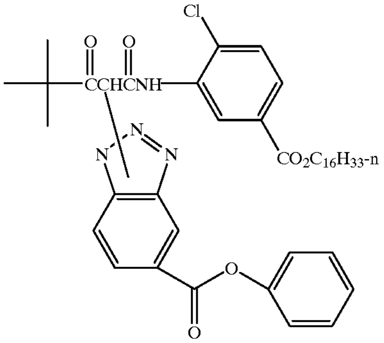
Coup-13
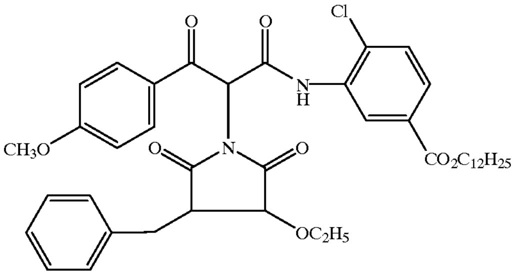
Chem-1 (1,2,4)Triazolo(1,5-a)pyrimidin-7-ol,5-methyl-, sodium salt
Chem-2
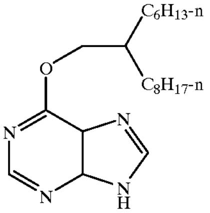

Chem-3 Cyclopenten-1-one,2,5-dihydroxy-5-methyl-3-(4-morpholinyl)-

Chem-4 N-(3-(2,5-dihydro-5-thioxo-1H-tetrazol-1-yl) phenyl) L-alanine

Chem-5

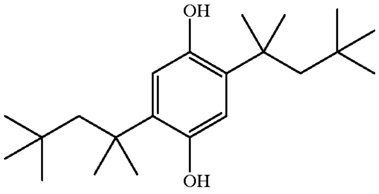

Dye-1

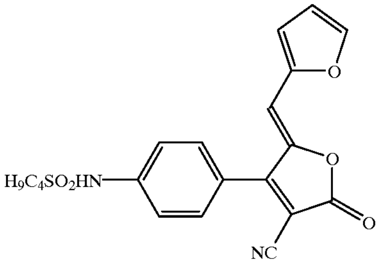

Dye-2

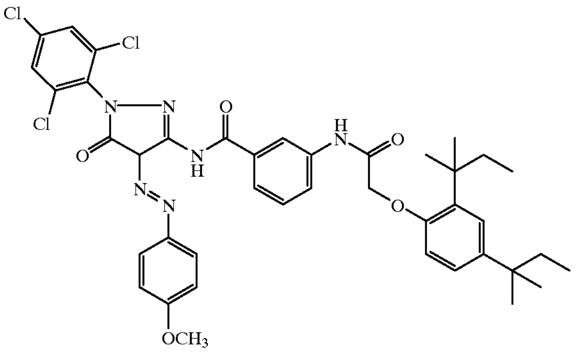

2,6-Anthracenedisulfonic acid, 9,10-dihydroxy-9,10-dioxo-4,8-bis(sulfomethyl)amino)-,tetrasodium salt Dye-3

Dye-4

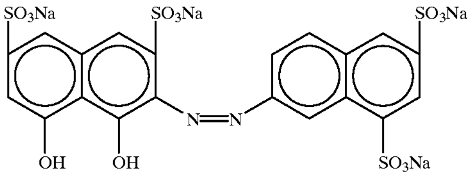

Dye-5 Propanedinitrile,(3-(dihexylamino)-2-propeneylidene)-

| Emulsion | Type | Diameter | Thickness | % bromide | Dye load | Dyes |
|---|---|---|---|---|---|---|
| SS cyan | T | .43μm | .11 μm | 99.5 | .66mm/m | C-1 |
| S cyan | T | .80 | .11 | 95.5 | .82 | C-1 |
| M cyan | T | 1.24 | .12 | 96.3 | 1.00 | C-1 |
| F cyan | T | 2.5 | .13 | 96.3 | .89 | C-1 |
| FF cyan | T | 3.9 | .13 | 96.3 | .79 | C-2 |
| SS magenta | T | .53 | .083 | 98.7 | .89 | M-1 |
| S magenta | T | .47 | .12 | 97.0 | 1.04 | M-1 |
| M magenta | T | 1.01 | .13 | 95.5 | 1.03 | M-1 |
| F magenta | T | 1.86 | .13 | 95.5 | .95 | M-1 |
| FF magenta | T | 2.9 | .13 | 96.3 | .85 | M-1 |
| SS yellow | T | .53 | .083 | 98.7 | 1.1 | Y-1 |
| S yellow | T | .99 | .14 | 98.6 | .90 | Y-1 |
| M yellow | T | 1.26 | .14 | 95.8 | .80 | Y-1 |
| F yellow | T | 2.67 | .13 | 95.8 | .80 | Y-1 |
| FF yellow | 3D | 1.22 | | 90.3 | .22 | Y-2 |

Sensitizing dyes -

C-1 = SD1 + SD2 + SD3

C-2 = SD1 + SD2 + SD4

M-1 = SD5 + SD6

Y-1 = SD7 + SD8

Y-2 = SD9

SD1

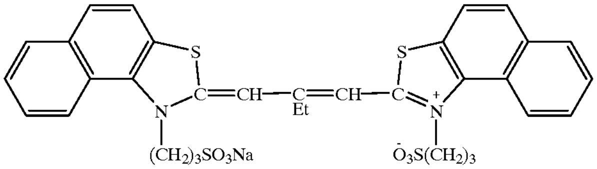

-continued
SD2
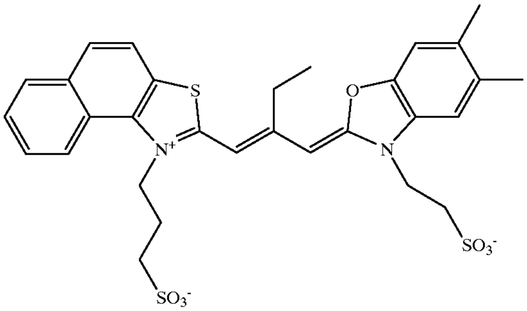
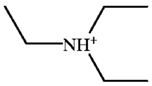
SD3
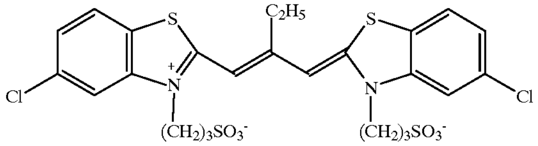
$HN^+(C_2H_5)_3$
SD4
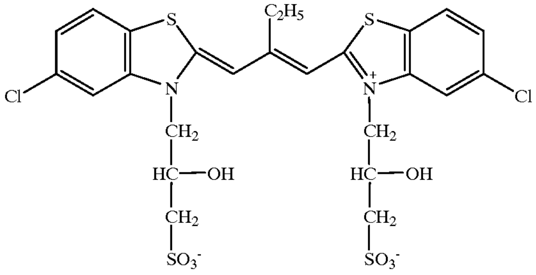
$Na^+$
or
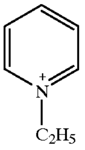
or HN
SD5
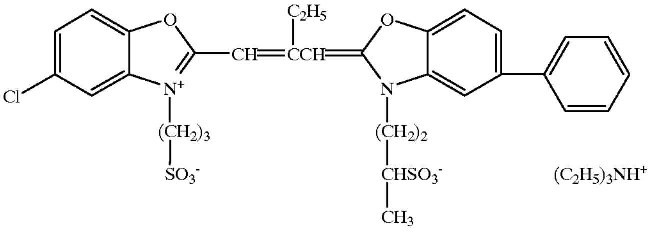
$(C_2H_5)_3NH^+$ -continued

SD6

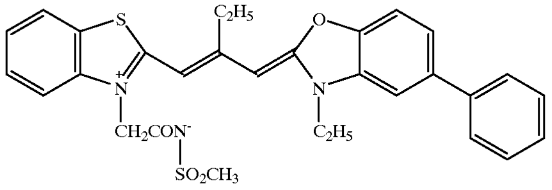

SD7

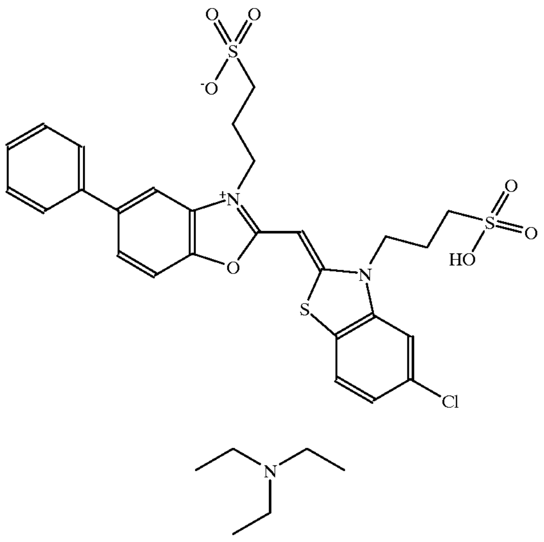

SD8

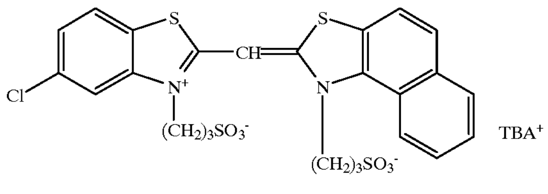

SD9

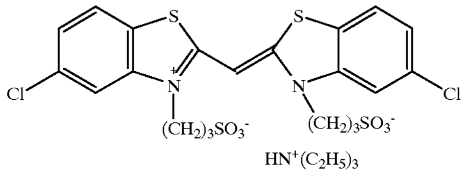

The multilayer film of the example provides improved underexposure latitude and overexposure printing density.

EXAMPLE 6

Consumer Preference Study

A set of twenty scenes was photographed with an inventive film and with three commercial color negative films outside the scope of the invention and all were all processed via Kodak Process C-41 and printed on KODAK EDGE 8 color paper on a Kodak CLAS 35 printer to simulate four consumer print orders. Each print was balanced so that the neutral balance of each order (the average of all 20 images) was less than 0.075 density of each other. This is equivalent to one printer button, a unit well known in the photofinishing trade. A significant number of scenes were underexposed. A representative group of 600 photographic consumers was asked to rank the four print orders for overall quality. The results were as follows:

TABLE II

| Sample | Type | Actual ISO Speed | Status M Green Density* | Ranked First % | Ranked First/Second % | Ranked Last % |
|---|---|---|---|---|---|---|
| 7 | Inv | 621 | 1.32 | 54 | 76 | 9 |
| 8 | Comp | 264 | 1.38 | 17 | 42 | 39 |
| 9 | Comp | 482 | 1.38 | 15 | 49 | 24 |
| 10 | Comp | 393 | 1.38 | 14 | 34 | 29 |

*At +2.01 log H from 0.15 above Dmin

From the results it is clear that consumers preferred the film with the best under exposure latitude and with green Density at +2.01 log H less than 1.34.

What is claimed is:

1. A color negative silver halide multilayer film exhibiting (a) an Aged ISO speed of at least 448;

(b) a Composite Average Slope (CS) such that $$0.50<CS<0.60;$$

(c) a Slope Ratio (G/B) of at least 0.88; and (d) Extended Overexposure Latitude (EOL) wherein the film element is packaged with a lens.

2. A packaged color negative film element (a) containing a designated ISO speed or Exposure Index (EI);

(b) exhibiting an Aged ISO speed at least 12% greater than that designated;

(c) exhibiting Extended Overexposure Latitude (EOL); and (d) exhibiting a Composite density ($D_c$), at a log H corresponding to 1.2 log H more exposed than that for an 18% gray card exposed as necessary for the designated speed, of not more than the value given by equation (I)

$$D_c=1.347+0.605(\log H_{Aged}-\log H_{Designated}) \quad \text{I.}$$

3. The element of claim 2 wherein the exhibited Aged ISO speed is at least 19% greater than that designated.

4. The element of claim 2 wherein the exhibited Aged ISO speed is at least 26% greater than that designated.

5. The element of claim 2 wherein $D_c$ is not more than the value given by the equation:

$$D_c=1.326+0.596(\log H_{Aged}-\log H_{Designated}).$$

6. The element of claim 2 wherein $D_c$ is not more than the value given by the equation:

$$D_c=1.306+0.586(\log H_{Aged}-\log H_{Designated}).$$

7. A packaged color negative film element (a) containing a designated ISO speed or Exposure Index (EI);

(b) exhibiting an Aged ISO speed at least 12% greater than that designated;

(c) exhibiting Extended Overexposure Latitude (EOL); and (d) exhibiting a Status M green density ($D_g$), at a log H corresponding to 1.2 log H more exposed than that for an 18% gray card exposed as necessary for the designated speed, of not more than the value given by equation (II)

$$D_g=1.340+0.591(\log H_{Aged}-\log H_{designated}) \quad \text{II.}$$

8. The element of claim 7 wherein the exhibited Aged ISO speed is at least 19% greater than that designated.

9. The element of claim 7 wherein the exhibited Aged ISO speed is at least 26% greater than that designated.

10. The element of claim 7 wherein $D_g$ is not more than the value given by the equation:

$$D_g=1.319+0.582(\log H_{Aged}-\log H_{Designated}).$$

11. The element of claim 7 wherein $D_g$ is not more than the value given by the equation:

$$D_g=1.300+0.573(\log H_{Aged}-\log H_{Designated}).$$

12. A packaged color negative film element (a) containing a designated ISO speed or Exposure Index (EI) of 400 or higher;

(b) exhibiting an Aged ISO speed of at least 12% greater than that designated; and (c) exhibiting Extended Overexposure Latitude (EOL).

13. The element of claim 12 wherein the film is packaged with a lens.

14. The element of claim 12 wherein the film also contains a magnetic layer.

15. The element of claim 13 wherein the film also contains a magnetic layer.

16. A process for forming an image after imagewise exposure of a packaged color negative film element (a) containing a designated ISO speed or Exposure Index (EI) of 400 or higher;

(b) exhibiting an Aged ISO speed of at least 12% greater than that designated; and (c) exhibiting Extended Overexposure Latitude (EOL);

comprising contacting the element with 4-amino-3-methyl-N-ethyl-N-(2-hydroxyethyl)aniline sulfate.

17. The process of claim 16 comprising the additional subsequent step of scanning the element and then optically printing the image.

18. The process of claim 16 comprising the additional subsequent step of scanning the element and then digitally printing the image.

19. A packaged color negative film element (a) containing a designated ISO speed of 400 or higher;

(b) exhibiting an Aged ISO speed of at least 12% greater than that designated; and (c) exhibiting Extended Overexposure Latitude (EOL).

20. A process for forming an image after imagewise exposure of a packaged color negative film element (a) containing a designated ISO speed of 400 or higher;

(b) exhibiting an Aged ISO speed of at least 12% greater than that designated; and (c) exhibiting Extended Overexposure Latitude (EOL);

comprising contacting the element with 4-amino-3-methyl-N-ethyl-N-(2-hydroxyethyl)aniline sulfate.

21. The process of claim 20 comprising the additional subsequent step of scanning the element and then optically printing the image.

22. The process of claim 20 comprising the additional subsequent step of scanning the element and then digitally printing the image.

23. A packaged color negative film element (a) containing a designated ISO speed of 400 or higher; and (b) exhibiting an Aged ISO speed of at least 12% greater than that designated.

24. A process for forming an image after imagewise exposure of a packaged color negative film element (a) containing a designated ISO speed of 400 or higher; and (b) exhibiting an Aged ISO speed of at least 12% greater than that designated;

comprising contacting the element with 4-amino-3methyl-N-ethyl-N-(2-hydroxyethyl)aniline sulfate.

25. The process of claim 24 comprising the additional subsequent step of scanning the element and then optically printing the image.

26. The process of claim 24 comprising the additional subsequent step of scanning the element and then digitally printing the image.

27. A packaged color negative film element (a) containing a designated ISO speed or Exposure Index (EI);

(b) exhibiting an Aged ISO speed at least 12% greater than that designated;

(c) exhibiting Extended Overexposure Latitude (EOL); and (d) exhibiting a Composite Average Slope (CS) such that 0.50<$CS$<0.60.

28. The element of claim 27 wherein the film is packaged with a lens.

29. The element of claim 27 wherein the element also contains a magnetic layer.

30. A process for forming an image after imagewise exposure of a packaged color negative film element (a) containing a designated ISO speed or Exposure Index (EI);

(b) exhibiting an Aged ISO speed at least 12% greater than that designated;

(c) exhibiting Extended Overexposure Latitude (EOL); and (d) exhibiting a Composite Average Slope (CS) such that $$0.50<CS<0.60;$$

comprising contacting the element with a para phenylenediamine developer.

31. The process of claim 30 wherein the developer is 4-amino-3-methyl-N-ethyl-N-(2-hydroxyethyl)aniline sulfate.

32. The process of claim 30 comprising the additional subsequent step of scanning the element and then optically or digitally printing the image.

33. The process of claim 32 wherein the subsequent step comprises optical printing.

34. The process of claim 32 wherein the subsequent step comprises digital printing.

35. The process of claim 32 wherein information derived from the scan is used to control the printer.

36. The process of claim 32 wherein information derived from the scan is digitally manipulated and then digitally printed or displayed.

37. A packaged color negative film element (a) containing a designated ISO speed or Exposure Index (EI);

(b) exhibiting an Aged ISO speed at least 12% greater than that designated;

(c) exhibiting Extended Overexposure Latitude (EOL); and (d) exhibiting a Green Average Slope (GS) such that $$0.50<GS<0.60.$$

38. A process for forming an image after imagewise exposure of a packaged color negative film element (a) containing a designated ISO speed or Exposure Index (EI);

(b) exhibiting an Aged ISO speed at least 12% greater than that designated;

(c) exhibiting Extended Overexposure Latitude (EOL); and (d) exhibiting a Green Average Slope (GS) such that $$0.50<GS<0.60;$$

comprising contacting the element with 4-amino-3methyl-N-ethyl-N-(2-hydroxyethyl)aniline sulfate.

39. The process of claim 38 comprising the additional subsequent step of scanning the element and then optically printing the image.

40. The process of claim 38 comprising the additional subsequent step of scanning the element and then digitally printing the image.

* * * * *